US005959253A

United States Patent [19]

Shinchi

[11] Patent Number: 5,959,253

[45] Date of Patent: Sep. 28, 1999

[54] WIRE CONNECTION STRUCTURE

[75] Inventor: Akira Shinchi, Shizuoka-ken, Japan

[73] Assignee: Yazaki Corporation, Tokyo, Japan

[21] Appl. No.: 09/003,705

[22] Filed: Jan. 7, 1998

[30] Foreign Application Priority Data

Jan. 9, 1997 [JP] Japan .................................... 9-002296

[51] Int. Cl.$^{6}$ .................................................. H02G 15/113

[52] U.S. Cl. .......................................... 174/88 R; 439/465

[58] Field of Search ............................... 174/88 R, 84 R, 174/92, 74 R; 29/868, 872; 439/465, 466, 499

[56] References Cited

U.S. PATENT DOCUMENTS

| | | | |
|---|---|---|---|
| 3,761,869 | 9/1973 | Hardesty et al. | 439/418 |
| 3,822,465 | 7/1974 | Frankort et al. | 228/111 |
| 5,057,650 | 10/1991 | Urushibata et al. | 174/88 R |
| 5,134,249 | 7/1992 | Adachi | 174/92 |
| 5,584,122 | 12/1996 | Kato et al. | 29/872 |

FOREIGN PATENT DOCUMENTS 7-70345 7/1995 Japan .

*Primary Examiner*—Dean A. Reichard
*Assistant Examiner*—Chau N. Nguyen
*Attorney, Agent, or Firm*—Finnegan, Henderson, Farabow, Garrett & Dunner, L.L.P.

[57] ABSTRACT

A wire connection structure having a connector housing body, a terminal holding portion provided on the connector housing body, a cover body for clogging the terminal holding portion 11, terminals disposed in the terminal holding portion, and covered wires containing core elements and cover portion, wherein each of the covered wires is placed in each of the terminals and each of the covered wires is pressed by the cover body toward the terminal while ultrasonic vibration is applied so as to melt the cover portion thereby making the core elements and the terminal into conductive contact with each other, the wire connection structure further having wire fixing portions which are provided on the cover body for fusing the covered wire with the terminal holding portion at a portion backward of a rear end of the terminal.

8 Claims, 3 Drawing Sheets

WIRE CONNECTION STRUCTURE

BACKGROUND OF THE INVENTION

1. Field of the Invention

This invention relates to a wire connection structure in which a covered wire is placed on a terminal and ultrasonic wave energy is applied thereto with a pressure so as to melt a cover portion of the wire thereby making core elements and a terminal into conductive contact with each other.

2. Description of Relevant Art

This kind of art has been disclosed in, for example, Japanese Patent Publication No.7-70345. FIGS. 1 are explanatory views for explaining that art while FIG. 1A shows a first member 1 and a second member 2. Both the members 1, 2 are formed of material (plastic) which can be fused by ultrasonic vibration. The first member 1 contains groove portions 3 and the second member 2 includes protrusions 4 which engage the groove portions 3.

FIGS. 1B, 1C show a state in which a terminal 7 is contained in a groove portion 3 and a covered wire 8 is placed thereon. At a bottom face of the groove portion 3 are formed small concave portions 3*a* and at a top face of the protrusion 4 are formed small protrusions 4*a* which engage the small concave portions 3*a*.

According to this art, as shown in FIGS. 1A, 1B, the terminal 7 is contained in the groove portion 3 and the covered wire 8 is placed thereon. Then, the second member 2 is mounted on a top face of the first member 1 such that the protrusions 4 are inserted into the groove portions 3. By applying ultrasonic vibration between the first and second members 1, 2 with a pressure, a cover portion of the covered wire 8 nipped between the protrusion 4 and groove portion 3 is melted so as to make the core elements of the covered wire 8 and the terminal 7 into conductive contact with each other. At the same time, the first and second members 1, 2 are fit to each other by fusion, so that an integrated connection structure as shown in FIG. 1D is obtained.

According to the aforementioned prior art, as shown in FIG. 1D, the groove portion 3 and protrusion 4 are provided with concave portions 3*a* and convex portions 4*a* respectively, so that the wire 8 and terminal 7 are bent and fixed together at the same time. However, because the terminal 7 is to be bent, control of the installation dimension of the terminal 7 is difficult. Further, because the bent portion carries out both holding of the wire and electrical connection, there is a fear that stress on the wire 8 may deteriorate reliability of electrical connection.

SUMMARY OF THE INVENTION

The present invention has been achieved with such points in view.

It therefore is an object of the invention to provide a wire connection structure which facilitates control of installation dimension of a terminal and is capable of maintaining reliability of electrical connection even when a stress is applied on a wire.

To achieve the object, a first aspect of the invention provides a wire connection structure comprising a connector housing body, a terminal holding portion provided on the connector housing body, a cover body for clogging the terminal holding portion, terminals disposed in the terminal holding portion, and covered wires containing core elements and cover portion, wherein each of the covered wires is placed in each of the terminals and each of the covered wires is pressed by the cover body toward the terminal while ultrasonic vibration is applied so as to melt the cover portion thereby making the core elements and the terminal into conductive contact with each other, the wire connection structure further comprising wire fixing portions which are provided on the cover body for fusing the covered wire with the terminal holding portion at a portion backward of a rear end of the terminal.

According to the first aspect, the wire fixing portion formed on the cover body is fused with the terminal holding portion so that the covered wire is nipped therebetween. Thus, a high wire holding performance can be exerted. Even if a pulling tension is applied to the wire from back, that force is absorbed by this portion thereby preventing that force from extending to a connection portion between the terminal and core elements. Therefore, reliability of electrical connection can be improved. Further, if a force is applied to the terminal from front, the terminal is prevented from retracting by the wire fixing portion, so that it can be engaged with a mating terminal appropriately thereby contributing to prevention of improper engagement of the connector.

To achieve the object, a second aspect of the invention provides a wire connection structure according to the first aspect wherein the terminal holding portion contains groove portions for containing the terminals, the cover body has protrusions which engage each of the groove portions and each of the wire fixing portions is formed on a top face of the protrusion so as to protrude.

According to the second aspect, when each of the protrusions is engaged with each of the groove portions, the wire fixing portion is also fit to the groove portion. Thus the wire is held at an appropriate position.

To achieve the object, a third aspect of the invention provides a wire connection structure according to the first or second aspect wherein a terminal side slope portion is formed at a rear end of the terminal, a wire fixing side slope portion is formed on the wire fixing portion and the wire fixing side slope portion positions the terminal at an appropriate position by sliding the terminal side slope portion, accompanying an operation of mounting the cover body on the terminal holding portion.

According to the third aspect, if the terminal is set apart from its proper position, the wire fixing portion brings it back to the proper position.

To achieve the object, a fourth aspect of the invention provides a wire connection structure according to the any one of first to third aspect wherein a space for releasing melted cover portion when the wire fixing portion is fused is provided inside the cover body behind the wire fixing portion.

According to the fourth aspect, the space for releasing the melted cover portion is provided, and therefore even if various kinds of the covered wires having a different diameter are used for connection, the melted cover portion can be released sufficiently in any case thereby holding the wire securely at the wire fixing portion.

BRIEF DESCRIPTION OF THE ACCOMPANYING DRAWINGS

The above and further objects and novel features of the present invention will more fully appear from the following detailed description when the same is read in conjunction with the accompanying drawings, in which:

FIGS. 1A, 1B, 1C, 1D are explanatory views of a prior art while FIG. 1A is a perspective view showing structures of a first and second members, FIG. 1B is a longitudinal sectional view showing a state in which a terminal and covered wire are contained in a groove portion of a first member, FIG. 1C is a front view showing the identical state and FIG. 1D is a longitudinal sectional view showing a state in which the connection is completed;

FIG. 2 is a disassembly perspective view of an embodiment of the present invention; and FIGS. 3A, 3B, 3C are sectional views of major parts in each step of the embodiment of the present invention.

DETAILED DESCRIPTION OF THE PREFERRED EMBODIMENTS

Figure 1A:
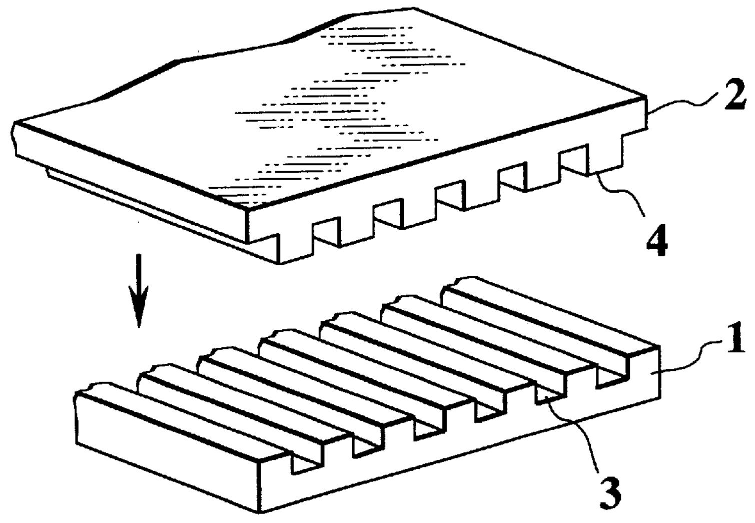
FIG.1A PRIOR ART
Figure 1B:
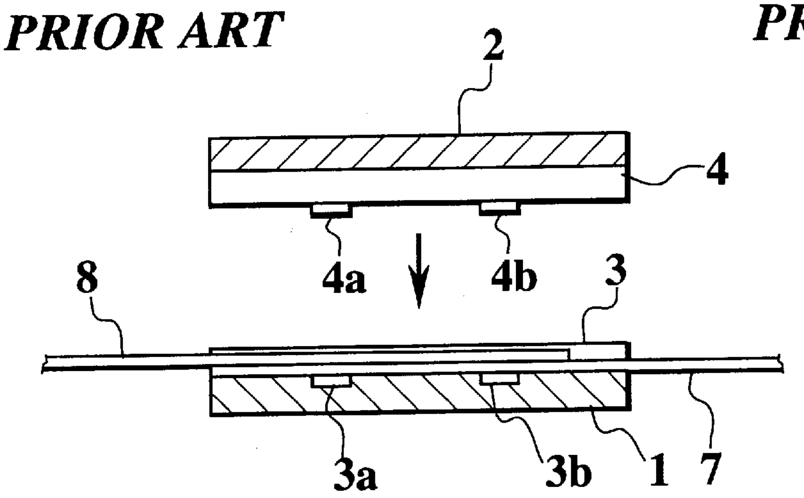
FIG.1B PRIOR ART
Figure 1C:
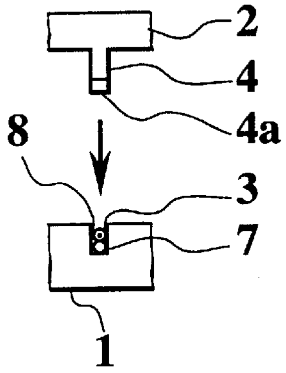
FIG.1C PRIOR ART
Figure 1D:
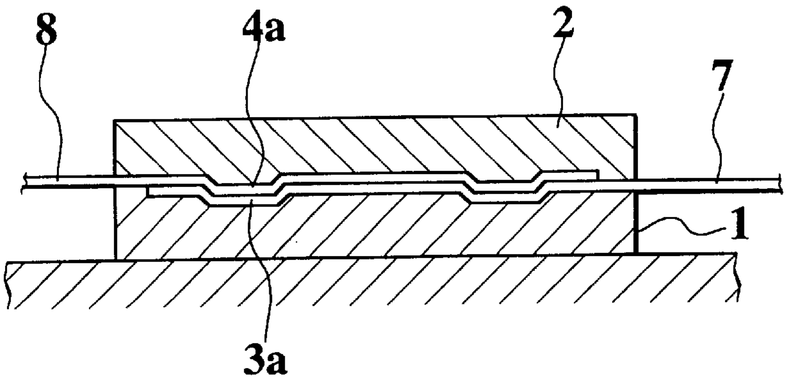
FIG.1D PRIOR ART

The contents of U.S. Pat. No. 5,584,122 are incorporated herein by reference.

There will be detailed below the preferred embodiments of the present invention with reference to the accompanying drawings. Like members are designated by like reference characters.

Figure 2:
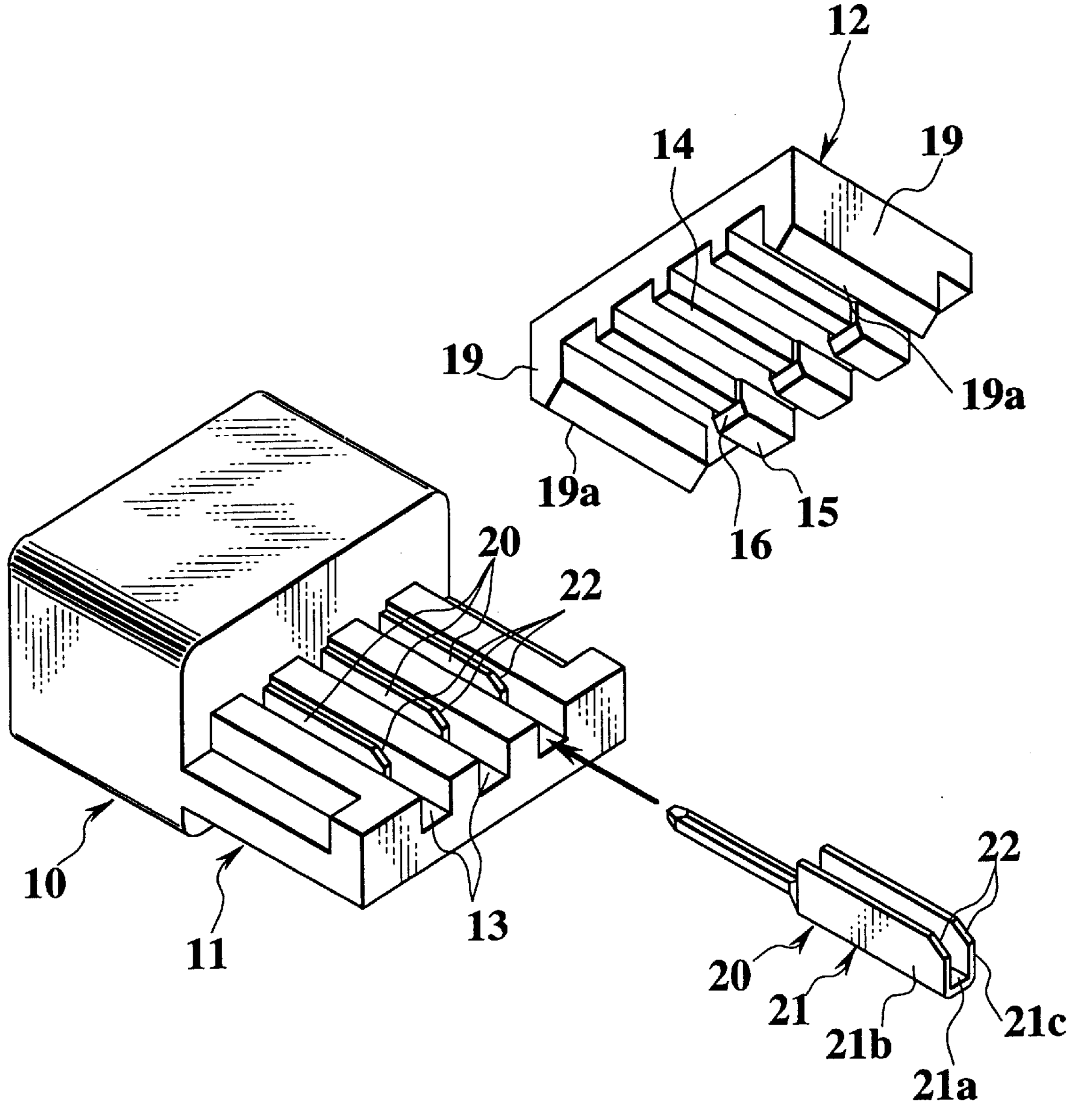

FIG. 2 is an explanatory view of a connection structure according to an embodiment of the present invention. Referring to the same Figure, reference numeral 10 denotes a connector housing body, numeral 12 denotes a cover body and numeral 20 denotes a terminal. The connector housing body 10 and cover body 12 are formed of resin which can be fused by ultrasonic wave. At a rear end of the connector housing body 10 is formed a protruding terminal holding portion 11. The cover body 12 is formed in a shape for clogging this terminal holding portion 11.

The terminal holding portion 11 has a plurality of groove portions 13 and the cover body 12 contains protrusions 14 which engage the groove portions 13. On a top face of a rear end of the protrusion 14 is disposed a wire fixing portion 15 which faces downward so as to protrude. The wire fixing portion 15 is formed in a width larger than the protrusion 14 so as to engage the groove portion 13 fittingly, and has a slope portion 16 at a front end corner thereof. Front end portions 19*a* of side wall 19 of the cover body 12 are pointed so as to be fused by ultrasonic wave when they are pressed to the terminal holding portion 11.

The terminal 20 has a wire connecting portion 21 having a U-shaped cross section at a rear end thereof. The wire connecting portion 21 comprises a bottom wall 21*a* on which a covered wire is to be placed and a pair of right and left vertical walls 21*b*, 21*b* raised from both edges of the bottom wall 21*a*. An interval between the pair of vertical walls 21*b*, 21*b* is designed so as to secure a predetermined gap between the vertical wall 21*b* and a side face of the protrusion 14 when the protrusion 14 is inserted between the vertical walls 21*b* and 21*b*. A corner of the rear end 21*c* of the vertical wall 21*b* is cut obliquely to form a slope portion 22 which corresponds to the slope portion 16 provided on the wire fixing portion 15 of the aforementioned cover body 12. The wire fixing portions 15 are formed slightly forward of the rear end of the cover body 12. Consequently, a space 17 for releasing melted cover portion is secured back of the wire fixing portion 15.

Figure 3A:
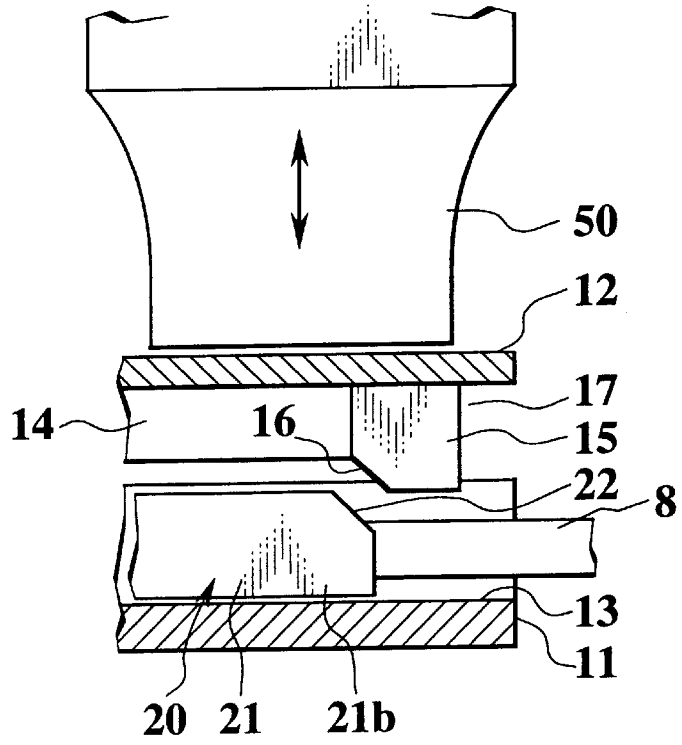
Figure 3B:
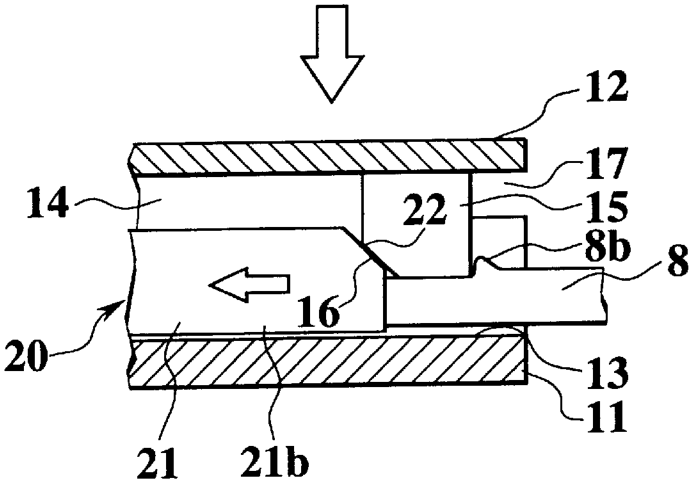
Figure 3C:
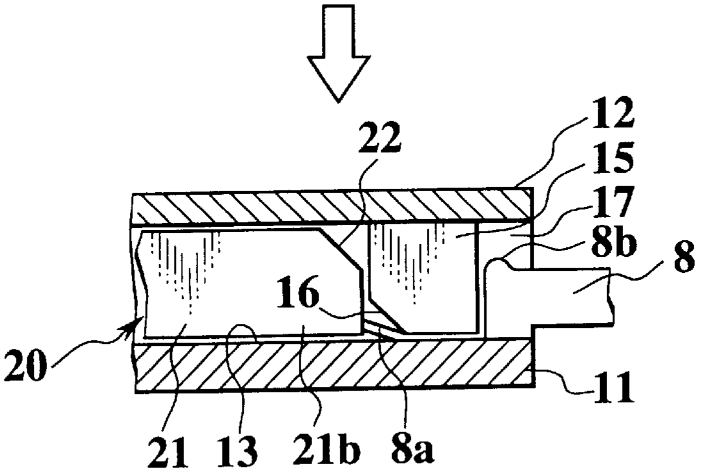

Referring to FIGS. 3A, 3B, 3C, steps for forming a connector by connecting the terminal 20 to the covered wire will be described.

First, the terminal 20 is inserted from a front end thereof into the groove portion 13 provided in the terminal holding portion 11 of the connector housing body 10 so that the wire connecting portion 21 is located in the terminal holding portion 11. Next, as shown in FIG. 3A, a covered wire 8 is placed on the bottom wall 21*a* of the wire connecting portion 21 of the terminal 20. Then, the cover body 12 is mounted thereon, such that each of the protrusions 14 of the cover body 12 is inserted into a gap between the vertical walls 21*b* of the wire connecting portion 21 of the terminal 20 disposed in each of the groove portions 13 of the terminal holding portion 11.

With this condition, a predetermined gap is secured between the vertical wall 21*b* and a side face of the protrusion 14. Further, there is secured an appropriate gap between the cover body 12 and terminal holding portion 11 (e.g., between a top face of the terminal holding portion 11 and a bottom face of the cover body 12) so as to avoid a contact therebetween except the front end portions 19*a* of side wall 19 of the cover body 12.

With this condition, as shown in FIG. 3B, the cover body 12 is pressed by a ultrasonic horn 50 and mounted on the terminal holding portion 11. If the terminal 20 is deviated backward from its proper position during that operation, the slope portion 16 at the front end of the wire fixing portion 15 makes contact with the slope portion 22 at the rear end 21*c* of the terminal 20, so that the terminal 20 slides and then is brought forward to its proper position.

At the same time when the protrusion 14 presses the covered wire 8, ultrasonic vibration is applied to the cover body 12 (applying vertical vibration). Consequently, ultrasonic wave energy is concentrated on the protrusion 14 which nips the covered wire 8 with a bottom face of the groove portion 13, so that a cover portion 8*b* of the covered wire 8 is melted and core elements 8*a* are exposed. Then, the core elements 8*a* make contact with the terminal 20 so that conductivity is attained therebetween.

Finally, as shown in FIG. 3C, a front end of the wire fixing portion 15 inserted into the groove portion 13 is fit to the melted cover portion 8*b* and terminal holding portion 11 by fusion, with the covered wire 8 nipped securely between that front end and the terminal holding portion 11, so that an integrated connector is produced.

Thus, the covered wire 8 is held firmly by the wire fixing portion 15 at a rear end of the terminal 20. Even if a tension is applied to the covered wire 8 from back, this is absorbed by this fused portion, so that that force is not extended to the terminal 20 and core elements 8*a*, thereby raising reliability of electrical connection. If a force is applied to the terminal 20 from front, the terminal 20 is prevented from retracting by the wire fixing portion 15, so that the terminal 20 can be engaged with a mating terminal appropriately, thereby contributing to prevention of improper engagement of the connector.

When the wire fixing portion 15 is fused, the melted cover portion 8*b* is accommodated by the space 17 back of the wire fixing portion 15. Thus, the appearance of the rear end of the connector is not damaged and the melted cover portion 8*b* can be released sufficiently, thereby intensifying the strength of the fused portion. In this case, because the space 17 is located back of the wire fixing portion 15, this can be set in a sufficiently large size thereby making it possible to correspond to the covered wires of many kinds of the diameter.

While preferred embodiments of the present invention have been described using specific terms, such description is for illustrative purposes, and it is to be understood that changes and variations may be made without departing from the spirit or scope of the following claims.

What is claimed is:

1. A wire connection structure comprising:

a connector housing body;

a terminal holding portion provided on said connector housing body;

cover body for clogging said terminal holding portion;

terminals disposed in said terminal holding portion; and covered wires containing core elements and cover portion, wherein each of said covered wires is placed in each of said terminals and each of said covered wires is pressed by said cover body toward each of said terminals while ultrasonic vibration is applied so as to melt said cover portion thereby bringing said core elements and each of said terminals into conductive contact with each other, said wire connection structure further comprising wire fixing portions which are provided on said cover body for fusing each of said covered wires with said terminal holding portion at a rearward portion of each of said terminals.

2. A wire connection structure according to claim 1 wherein said terminal holding portion contains groove portions for containing said terminals, said cover body has protrusions which engage each of said groove portions and each of said wire fixing portions protrudes from a top face of each of said protrusions.

3. A wire connection structure according to claim 1 or 2 further comprising a terminal side slope portion formed at a rear end of each of said terminals and a wire fixing side slope portion formed on each of said wire fixing portions wherein sliding each of said terminal side slope portions along each of said wire fixing side slope portions positions each of said terminals at an appropriate position when mounting said cover body on said terminal holding portion.

4. A wire connection structure according to claim 1 further comprising a space for releasing said melted cover portion when said wire fixing portion is fused inside said cover body behind said wire fixing portions.

5. A wire connection structure comprising:

a connector housing body;

a terminal holding portion provided on said connector housing body;

a cover body for clogging said terminal holding portion;

a terminal disposed in said terminal holding portion; and a covered wire containing core elements and a cover portion, wherein said covered wire is placed on said terminal and said covered wire is pressed by said cover body toward said terminal while ultrasonic vibration is applied so as to melt said cover portion thereby bringing said core elements and said terminal into conductive contact with each other, said wire connection structure further comprising a wire fixing portion which is provided on said cover body for fusing said covered wire with said terminal holding portion at a rearward portion of said terminal.

6. A wire connection structure according to claim 5 wherein said terminal holding portion contains a groove portion for receiving said terminal, said cover body has a protrusion which engages said groove portion, and said wire fixing portion protrudes from a top face of said protrusion.

7. A wire connection structure according to claim 5 or 6 further comprising a terminal side slope portion formed at a rear end of said terminal and a wire fixing side slope portion formed on said wire fixing portion wherein sliding said terminal side slope portion along said wire fixing side slope portion positions said terminal at an appropriate position when mounting said cover body on said terminal holding portion.

8. A wire connection structure according to claim 5 further comprising a space for releasing said melted cover portion when said wire fixing portion is fused inside said cover body behind said wire fixing portion.

* * * * *

UNITED STATES PATENT AND TRADEMARK OFFICE

CERTIFICATE OF CORRECTION

PATENT NO. : 5,959,253
DATED : September 28, 1999
INVENTOR(S) : Akira SHINCHI

It is certified that error appears in the above-identified patent and that said Letters Patent is hereby corrected as shown below:

Claim 1, column 5, line 3, before "cover", insert --a--.

Signed and Sealed this

Twenty-seventh Day of June, 2000

*Attest:*

Q. TODD DICKINSON

*Attesting Officer*

*Director of Patents and Trademarks*